United States Patent
Zucchelli

(10) Patent No.: US 10,093,801 B2
(45) Date of Patent: Oct. 9, 2018

(54) HALOGEN-FREE FLAME RETARDANT POLYAMIDE MOULDING COMPOSITIONS WITH INCREASED GLOW WIRE AND FIRE RESISTANCE

(71) Applicant: ITALMATCH CHEMICALS S.p.A., Genoa (IT)

(72) Inventor: Ugo Zucchelli, San Benigno (IT)

(73) Assignee: ITALMATCH CHEMICALS S.P.A., Genoa (IT)

( * ) Notice: Subject to any disclaimer, the term of this patent is extended or adjusted under 35 U.S.C. 154(b) by 0 days.

(21) Appl. No.: 15/103,431

(22) PCT Filed: Dec. 12, 2013

(86) PCT No.: PCT/IB2013/002751
§ 371 (c)(1),
(2) Date: Jun. 10, 2016

(87) PCT Pub. No.: WO2015/087099
PCT Pub. Date: Jun. 18, 2015

(65) Prior Publication Data
US 2016/0304715 A1  Oct. 20, 2016

(51) Int. Cl.
| | |
|---|---|
| C08L 77/02 | (2006.01) |
| C08L 77/06 | (2006.01) |
| C08K 3/32 | (2006.01) |
| C08K 5/3492 | (2006.01) |
| C08K 5/5313 | (2006.01) |
| C08L 23/08 | (2006.01) |

(52) U.S. Cl.
CPC ............... *C08L 77/02* (2013.01); *C08K 3/32* (2013.01); *C08K 5/34924* (2013.01); *C08K 5/5313* (2013.01); *C08L 23/0861* (2013.01); *C08L 77/06* (2013.01); *C08L 2201/02* (2013.01); *C08L 2201/22* (2013.01); *C08L 2207/04* (2013.01)

(58) Field of Classification Search
CPC ...... C08L 77/00–77/12; C08L 2201/02; C08L 2201/22
See application file for complete search history.

(56) References Cited

U.S. PATENT DOCUMENTS

| | | |
|---|---|---|
| 601,172 A | 3/1898 | Seguy |
| 655,371 A | 8/1900 | Louis |
| 5,973,194 A | 10/1999 | Weferking et al. |
| 6,090,968 A | 7/2000 | Horold et al. |
| 6,278,012 B1 | 8/2001 | Horold et al. |
| 6,300,516 B1 | 10/2001 | Weferling et al. |
| 6,329,544 B1 | 12/2001 | Weferling et al. |
| 6,355,832 B1 | 3/2002 | Weferling et al. |
| 6,359,171 B1 | 3/2002 | Weferling et al. |
| 2002/0079480 A1 | 6/2002 | Sicken et al. |
| 2003/0073865 A1 | 4/2003 | Sicken et al. |
| 2004/0227130 A1 | 11/2004 | Hoerold et al. |
| 2005/0137300 A1 | 6/2005 | Schlosser et al. |
| 2005/0137418 A1 | 6/2005 | Bauer et al. |
| 2005/0234161 A1 | 10/2005 | Steib et al. |
| 2006/0074157 A1 | 4/2006 | Bauer et al. |
| 2006/0084734 A1 | 4/2006 | Bauer et al. |
| 2007/0072967 A1 | 3/2007 | Nass et al. |
| 2008/0033079 A1* | 2/2008 | Costanzi .................. C08K 3/32 524/100 |
| 2008/0161490 A1 | 7/2008 | Endtner et al. |

FOREIGN PATENT DOCUMENTS

| | | |
|---|---|---|
| CA | 2641112 | 6/1996 |
| DE | 10 2004 019716 | 8/2005 |
| EP | 6568 | 6/1979 |
| EP | 699708 | 8/1995 |
| EP | 1016623 | 12/1999 |
| EP | 2 186 861 | 5/2010 |
| JE | 19910322 | 7/2000 |
| WO | WO 2005/075566 | 8/2005 |
| WO | 09010812 | 1/2009 |
| WO | WO 2013/045966 | 4/2013 |

OTHER PUBLICATIONS

Machine translation of DE-102004019716-A1. (Year: 2005).*
International Search Report and Written Opinion of the ISA for PCT/IB2013/002751, dated Aug. 28, 2014, 13 pages.
Reply to Written Opinion, dated Oct. 2, 2015, 1 page.
International Preliminary Report on Patentability, dated Mar. 4, 2016, 16 pages.
Notice of Allowance dated Jul. 4, 2017 for corresponding EP application No. 13823983.5.
Decision to grant dated Oct. 12, 2017 for corresponding EP application No. 13823983.5.
Hypophosphorous Acid Acid and Its Salts, Russian Chemical Review, 44(12), 1975.

* cited by examiner

Primary Examiner — Wenwen Cai

(57) ABSTRACT

The present invention relates to halogen-free flame retardant compositions essentially comprising polyamide polymers (preferred is PA6), at least an Hypophosphorous acid metal salt (preferred is Aluminum hypophosphite), at least an organic phosphinate metal salt (preferred is Aluminum Di Ethyl Phosphinate), at least a Nitrogen based flame retardant agent (preferred is Melamine Cyanurate), at least an organic polyhydric polymer (preferred is EVOH) and optionally further conventional components. Such compositions are highly flame retarded at low thickness and have high Glow Wire temperature resistance.

8 Claims, No Drawings

HALOGEN-FREE FLAME RETARDANT POLYAMIDE MOULDING COMPOSITIONS WITH INCREASED GLOW WIRE AND FIRE RESISTANCE

This application is the U.S. national phase of International Application No. PCT/IB2013/002751 filed 12 Dec. 2013, which designated the U.S., the entire contents of which is hereby incorporated by reference.

BACKGROUND OF THE INVENTION

The chemical composition of organic polymers make them easily combustible. Wide varieties of flame retardant additives are blend into polymers to achieve stringent standards demanded by processors and even by legislation.

Recently, despite the fact that traditional brominated FR are well suited for most of application, some preference has been given to halogen free flame retardant additives because of environmental as well as for safety reasons. Consequently, halogen free flame retardant (FR) agents are of increasing interest in the thermoplastic polymers market. Basic requirements for these products are good processing characteristics in compounding and moulding conditions, good mechanical and electrical properties in the solid state, no blooming or discoloration, good flame retardant properties in both reinforced and unreinforced polymers.

Particularly, flame retardant agents commonly used in Polyamides must satisfy stringent requirements concerning high processing temperatures, the absence of residual acidity that could cause polymer hydrolysis and the avoidance of blooming effects. These various requirements have limited the use of most of the known halogen free additives, apart from Red Phosphorus, Organic phosphinates and Hypophosphites (also called Hypophosphorus acid metal salts or inorganic Phosphinates).

Red phosphorus is the most effective flame retardant additive, especially for glass fiber reinforced polyamide, but its inherent red colour makes the corresponding polymer product difficult to be used for very light colours applications.

Organic phosphinates metal salts have the following chemical Formula (I):

FORMULA (I)

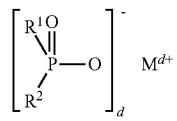

where:
"d" is an integer number ranging from 1 to 4 in dependence of the valence of the metal M. Metal M is any element belonging to groups I, II, III and IV of the periodic table of the elements. Preferred metals are selected as Aluminum, Zinc, and Calcium. $R^1$ and $R^2$ are identical or different and are selected as hydrogen, $C_1$-$C_6$-alkyl, linear or branched, aryl, provided that $R^1$ and $R^2$ be never selected as Hydrogen at the same time.

In other words, when $R^1$=H, $R^2$ must be $C_1$-$C_6$-alkyl, linear or branched, aryl. When, on the other hand, $R^2$=H, $R^1$ must be $C_1$-$C_6$-alkyl, linear or branched, aryl.

When one of $R^1$ or $R^2$ are hydrogen, resulting compounds of Formula (I) are called mono-alkyl-phosphinates.

This family of organic phosphinates metal salts was described as flame retardant agents for example in EP 699708 and EP 6568.

Organic phosphinates metal salts are particularly efficient in polyamides, especially when used in conjunction with a melamine containing product, the resulting mixture being more effective than organic phosphinates alone. These products, with particular regard to zinc and especially aluminium diethyl phosphinate, are currently commercially available under the "Exolit OP" brand, Clariant.

Different processes for the preparation of Organic phosphinates metal salts were described, for instance in: CA 2641112, U.S. Pat. No. 6,300,516, U.S. Pat. No. 5,973,194, U.S. Pat. No. 601,172, DE 19910232, U.S. Pat. No. 6,090,968, EP 1016623, U.S. Pat. No. 6,329,544, U.S. Pat. No. 6,355,832, U.S. Pat. No. 6,359,171, U.S. Pat. No. 6,278,012, US 2003073865, US 2002079480, US 2006074157, US 2005137418. Combinations of organic Phosphinates metal salts and condensation products of melamine and/or reaction products of melamine with phosphoric acid in polyamides and other thermoplastic polymers are described for example in U.S. Pat. No. 655,371, US 2004/0227130, US 2005/0137300, US 2005/0234161, US 2006/0084734, US 2007/0072967, US 2008/0161490.

Hypophosphites (also called Hypophosphorus acid metal salts or inorganic Phosphinates) have been reported as effective halogen free flame retardant additives for polymers.

Hypophosphites are compounds of Formula (I) wherein $R^1$ and $R^2$ are selected as Hydrogen and "d" is an integer number ranging from 1 to 4 in dependence of the valence of the metal M. The metal is any element belonging to the groups I, II, III and IV of the periodic table of the elements. Preferred metals are Aluminium and Calcium.

Sodium and calcium Hypophosphites are currently widely commercially available and they are normally produced by reacting the corresponding metal hydroxide on yellow phosphorus, for instance according to the following reaction scheme:

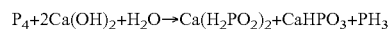

Hypophosphites of metals other than Calcium and Sodium are normally produced through the hypophosphorus acid reaction on the metal hydroxide or by exchange reaction with the corresponding soluble metal salts (see for instance "Hypophosphorus Acid and its salts", *Russian Chemical Review*, 44 (12), 1975). Thermoplastic polyamides moulding materials containing Hypophosphites as flame retardant agents, were described, for instance in WO 09/010812, WO 2005/075566 and WO 2013/045966

According to WO 09/010812, a polymer composition, particularly based on polyesters or polyamides and comprising hypophosphites coated with inorganic hydrates and/or organic salts, is described.

According to WO 2005/075566, a polyamide is made flame retardant by the addition of at least Aluminium Hypophosphite in the range of 1% to 30% by weight.

According to WO 2013/045966, a polyamide is made flame retardant by the addition of at least an hypophosphorus acid metal salt (preferred is Aluminium hypophosphite), at least a nitrogen flame retardant agent, at least an organic polyhydric compound.

OBJECT OF THE INVENTION

Object of the present invention is to provide halogen-free highly flame retardant polyamides, unreinforced or reinforced.

In the purpose of the present invention, the term "highly flame retardant" means ranking V0 classification on thin items, according to international standard UL-94.

Thin items means thickness preferably lower than about 0.8 mm, and more preferably equal to 0.6 mm or even lower.

Another object of present invention is to provide halogen free flame retardant polyamides with high Glow Wire resistance, particularly passing the GWIT test at higher than 800° C., according to IEC 61335-1.

Another object of present invention is to provide halogen free flame retardant moulding compositions and articles based on polyamides with good electrical properties, good mechanicals and weathering resistance.

DESCRIPTION OF THE INVENTION

These and other objects according to the present invention are achieved by a polymer composition consisting of
  a) at least a thermoplastic polyamide polymer,
  b) at least an Hypophosphite (also called Hypophosphorus acid metal salt or inorganic Phosphinate) as a first flame retardant ($1^{st}$ FR component)
  c) at least an Organic phosphinate metal salt as a second flame retardant ($2^{nd}$ FR component)
  d) at least a nitrogen based flame retardant agent as a third flame retardant ($3^{rd}$ FR component)
  e) at least an organic polyhydric polymer, as a fourth flame retardant ($4^{th}$ FR component)
  f) fillers and/or reinforcing fibers
  g) other conventional additives.

The total percentage of components a) to g) must be 100%.

The above percentage value is expressed in either weight or volume, preferably in weight.

Particularly, according to the present invention, said conventional additives are, for example, selected among: processing aids, heat and process stabilizers, UV stabilizers, antidripping agents, pigments, dispersing agents, mould release additives, nucleating agents, partially crosslinked elastic polymers, and their mixtures. More particularly, said preferred antidripping agents are PTFE (polytetrafluoroethylene). Examples of preferred reinforcing fibers according to the present invention are carbon fibers, aramid fibers and preferably glass fibers to be used in the commercially available form of chopped glass. In order to improve compatibility with thermoplastic resins, the reinforcing fibers may have been surface treated with a silane compound. Reinforcing fibers are used in the range from 10% to 50%, preferably from 20% to 35% by weight on the weight of the resin: if the amount is lower, no advantage is observed in the mechanical properties and if the amount is higher than 50% by weight, viscosity of the melt is too high.

Example of fillers according to the invention are glass beads, hollow glass spheres, amorphous silica, chalk, mica, calcinated kaolin, wollastonite, talc, magnesium carbonate, barium sulphate or similar products and they may have been surface treated with fatty acids or the like or may have been milled in presence of fatty acids or the like. Any particulate substance currently available in the market as a filler for thermoplastic resins may be used in the compositions according to the present invention, provided that the average particle size of the powder, measured by laser instrument, is in the range of about 2 microns to 20 microns.

Always according to the present invention, said thermoplastic polyamide polymer is preferably polyamide 6.

According to the invention, said first flame retardant component ($1^{st}$ FR component) is preferably Aluminium Hypophosphite.

Second flame retardant ($2^{nd}$ FR component) component is preferably Aluminium Diethyl Phosphinate.

Third flame retardant ($3^{rd}$ FR component) component is preferably Melamine Cyanurate.

Fourth flame retardant ($4^{th}$ FR component) component is preferably selected as Ethylene Vinyl alcohol copolymer.

The flame retardant (FR) agents total content, is preferably lower than 30% in weight, so that mechanicals and electrical properties of the resulting final polymer are satisfactory with respect to most of the desired applications.

Further aspects of the present invention, are described here below in more details.

a) Thermoplastic Polyamide Polymer

According to present invention, polyamide polymers comprise:

1) Polyamide prepared by polycondensation reaction of saturated dicarboxylic acid having from 6 to 12 carbon atoms, with a saturated aliphatic primary diamine having from 6 to 12 carbon atoms.

2) Polyamino acids prepared either by a direct polycondensation reaction of an omega amino-alkanoic acid and containing a hydrocarbon chain having from 4 to 12 carbon atoms or by hydrolytic ring opening and polymerization of lactams derived from such acids;

3) Co-polyamides prepared from the starting monomers of the above mentioned polyamides provided that the acid component of said copolyamides may partially comprise terephtalic acid and/or isophtalic acid;

4) Mixtures of the above indicated polyamides.

Examples of polyamides prepared by polycondensation reaction of diacids and diamines, according to above point 1), include:

Nylon 6,6 (polymer of hexamethylene diamine and adipic acid)

Nylon 6,9 (polymer of hexamethylene diamine and azelaic acid)

Nylon 6,12 (polymer of hexamethylene diamine and dodecanoic acid)

Examples of polyamino acids, according to above point 2), include:

Nylon 4 (polymer of 4-amino butanoic acid or gamma butyro lactam)

Nylon 6 (polymer of epsilon caprolactam)

Nylon 8 (polymer of caprylactam)

Nylon 1010

Nylon 12 (polymer of laurylactam)

Polyamides may be based on renewably sources monomers, completely or partially. Examples of copolyamides, according to above mentioned point 3), include Nylon 6/6,6 (copolymer of hexamethylene diamine, adipic acid and caprolactam); Nylon 6,6/6,10 (copolymer of hexamethylene diamine, adipic acid and sabacic acid). Preferred polyamides to be flame retarded according to present invention are Polyamide (Nylon) 6 and polyamides with lower melting point than polyamide 6 (i.e. a melting point of about 220° C.). A sharp melting point is common to all nylon homopolymers, while some copolymers are characterized by broader melting points. Examples of preferred polyamides to be flame retarded according to present invention are:

Polyamide (Nylon) 6
Polyamide (Nylon) 6,10
Polyamide (Nylon) 6,11
Polyamide (Nylon) 1010
Polyamide (Nylon) 11

Polyamide (Nylon) 12
Polyamide (Nylon) 6,12
Polyamide (Nylon) 6,10 b) Hypophosphites Also Called Hypophosphorus Acid Metal Salt, Also Called Inorganic Phosphinate Metal Salts The selection of most appropriate Hypophosphite is subjected to a number of critical factors. Particularly, suitable hypophosphites must have sufficient thermal stability to overcome melt processing at temperature higher than around 200° C. If they do form hydrates, they must be used in the corresponding anhydrous form and they must not be hygroscopic when successively exposed to ambient humidity. Examples of such Hypophosphites are Aluminum hypophosphite (CAS 7784-22-7), Calcium hypophosphite (CAS 7789-79-9), Manganese hypophosphite (10043-84-2), Magnesium hypophosphite (CAS 10377-57-8), Zinc hypophosphite (CAS 15060-64-7), Barium hypophosphite (CAS 171258-64-3). Most preferred according to the present invention are Aluminum and Calcium Hypophosphites.

Aluminum hypophosphite, corresponding to chemical formula $Al(H_2PO_2)_3$, is currently produced by Italmatch Chemicals Spa (under commercial name "Phoslite IP-A") in a white powder form with a low humidity level, high purity and different PSD suitable for thermoplastic processing.

Calcium hypophosphite, corresponding to chemical formula $Ca(H_2PO_2)_2$, is also currently produced by Italmatch Chemicals Spa (under commercial name "Phoslite IP-C") This compound shows lower flame retardant performances in polyamides when compared to Aluminum hypophosphite. However, it can be advantageously used in those applications where thermal resistance of Aluminum hypophosphite would be critical. Aluminum and Calcium hypophosphites, being flammable powders as most of anhydrous hypophosphites, are often commercialized as a dry blend powder with other solid flame retardant agents or even in masterbatch form, for easier transport and manipulation.

c) Organic Phosphinates

Example of organic phosphinate metal salts are:

Aluminum diethyl phosphinate, currently commercially available as Exolit OP1230 and 1240 (CAS 225789-38-8).

Aluminum salts of 1-hydroxydihydrophosphole oxide and 1-hydroxypholane oxide as described in EP 794191.

Aluminum diisobutyl phosphinate as described in US 2008/0132619.

Mixtures of monoalkyl phosphinate and dialkylphosphinate metal salts as described in US 2010/00766132.

Thermogravimetric analysis under Nitrogen at 20° C./minute scanning temperature show that organic phosphinates metal salts have generally a much higher level of volatilization compared to inorganic phosphinates. For instance, at temperature higher than 500° C., Aluminum hypophosphite show a residue of around 70%, while Aluminum diethyl phosphinate show a residue of only around 10%.

Without being linked to any theory, it is believed that the particular Flame retardant efficiency of the system here disclosed is at least partially due to the combination of gas phase and solid state (or char forming phase) of additives containing phosphorus in the oxidation state +1. Both organic phosphinate and hypophosphite metal salts indeed contains Phosphorus in the oxidation state +1, but in case of the organic phosphinate product is more volatile and in case of hypophosphite metal salt product is less volatile and more char forming, as demonstrated for instance by the TGA curves.

d) Nitrogen Based Flame Retardant Agent

The selection of Nitrogen base flame retardant is also subjected to a number of critical factors. Particularly, suitable Nitrogen based flame retardant agents must have sufficient thermal stability to overcome melt processing at temperature higher than around 200° C. Moreover, they should not migrate to surface when they are incorporated into the polymer matrix, they must be available in suitable PSD for thermoplastic processing, not giving rise to decomposition and/or discoloration after compounding.

For example, a commonly used flame retardant containing Nitrogen agent for polymers is Ammonium Polyphosphate $(NH_4PO_3)_n$. Despite Ammonium Polyphosphate is sufficient thermally stable as such, it gives reaction and decomposition when put in contact with Hypophosphites. For the above reasons, Ammonium Polyphosphate as a source of Nitrogen, is out of the scope of present invention, being not compatible with Hypophosphites.

Preferred Nitrogen based flame retardant agents according to the present invention, include triazine derivatives, complexes and condensation products, with high Nitrogen content. Triazine is the chemical species of six-membered heterocyclic ring compound with three Nitrogens replacing carbon-hydrogen units in the benzene ring structure.

Preferred triazine derivatives within the scope of the present invention are derivatives of symmetric triazines. A review on derivative of symmetric triazine is given in "Recent applications of 2,4,6-trichloro-1,3,5-triazine and its derivatives in organic synthesis, Tetraedron 62/2006, 9597 9522".

Particularly preferred are derivative of Melamine (1,3,5-Triazine-2,4,6-triamine, or 2,4,6-Triamino-s-triazine).

According to the present invention, most preferred Nitrogen based flame retardant agents are condensation products of Melamine, like Melam (CAS 3576-88-3), Melem (CAS 1502-47-2), Melon (CAS 32518-77-7). Melam, Melem, Melon, pure or in mixtures, are also preferred options.

Melamine cyanurate is also a preferred option, according to the invention. Melamine cyanurate, chemical minimal formula $C_6H_9N_9O_3$, is a complex of Melamine and Cyanuric acid.

Phosphoric acid Melamine salts or adduct like Melamine Phosphate, Pyrophosphate or Polyphosphate are out of the scope of the invention, giving reactions and decomposition when put in contact with Hypophosphites. Melamine phosphate and pyrophosphate are not thermally stable to be processed into thermoplastic polyamides, evolving water at temperatures lower than about 200° C.

e) Organic Polyhydric Polymer

An organic polyhydric polymer may be defined as an organic polymeric molecule containing many hydroxyl (—OH) radicals, not linked to aromatic or conjugated unsutured bonds. A polymer may be defined as a molecule of high molecular structure, the structure of which comprise the multiple repetition of units derived, actually or conceptually, from molecules of low relative molecular mass (IUPAC definition).

For example, $Mg(OH)_2$ does not belong to organic polyhydric polymer definition, despite the fact that hydroxyl groups are present, because it is an inorganic compound. Also phenol-formaldehyde resins do not belong to organic polyhydric polymer definition, because in this case, hydroxyl group is linked to benzene.

Pentaerythritol, chemical formula $C_5H_{12}O_4$, with —OH content=49.9% by weight, does not belong to organic polyhydric polymer definition, despite contains many hydroxyl radicals (—OH), because does not fit the polymer definition.

Also blends of pentaerythritol, dipentaerythritol which are currently widely commercially available, and mixtures in any proportion, do not belong to organic polyhydric polymers, because singles molecules do not fit the polymer definition. Ethylene vinyl alcohol (EVOH) is a formal copolymer of ethylene and vinyl alcohol. Because the latter monomer mainly exists as its tautomer acetaldehyde, the copolymer is prepared by polymerization of ethylene and vinyl acetate to give the ethylene vinyl acetate (EVA) copolymer followed by hydrolysis. EVOH copolymer is mainly defined by the mole % ethylene content, and MFR values. The mole % ethylene is the molar content of the ethylene on the total molar content of units of ethylene and vinyl alcohol, express in percentage. Melt flow index or MFI is a measure of the ease of flow of the melt of a thermoplastic polymer. It is defined as the mass of polymer, in grams, flowing in ten minutes through a capillary of a specific diameter and length by a pressure applied via prescribed alternative gravimetric weights for alternative prescribed temperatures. The method is described in the similar standards ASTM D1238 and ISO 1133.

EVOH is a preferred organic polyhydric polymer according to present invention.

f) Fillers and/or Reinforcing Fibers

Examples of preferred reinforcing fibers are carbon fibers, aramid fibers and preferably glass fibers to be used in the commercially available form of chopped glass. In order to improve compatibility with thermoplastic resins, the reinforcing fiber may have been surface treated with a silane compound. Reinforcing fibers are used in the range from 10% to 50%, preferably from 20% to 35% by weight on the weight of the resin: if the amount of reinforcing fiber is lower than 10%, no advantage is observed in the mechanical properties of the final product, while if the amount is higher than 50% by weight, viscosity of the melt is found too high.

Example of fillers are glass beads, hollow glass spheres, amorphous silica, chalk, mica, calcinated kaolin, wollastonite, talc, magnesium carbonate, barium sulphate or similar products. They also may have been surface treated with fatty acids or the like, or may have been milled in the presence of fatty acids or the like. Any particulate substance currently available in the market as filler for thermoplastic resins, may be used in the compositions according to the present invention, provided that the average particle size of the powder, when measured by laser instrument, is in the range of about 2 microns to 20 microns.

g) Other Conventional Additives

Novel thermoplastic compositions may also contain one or more of the following compounds: processing aids, heat and process stabilizers, UV stabilizers, antidripping agents, pigments, dispersing agents, mould release additives, nucleating agents, partially crosslinked elastic polymers used as impact modifiers, and their mixtures. An example of antidripping agent is PTFE (polytetrafluorethylene).

A polyamide thermoplastic composition according to the invention is characterized in that it comprises:
b) from 5% to 20% by weight of Aluminium hypophosphite,
d) from 3% to 15% by weight of a Melamine cyanurate
c) from 2.5% to 10% by weight of Aluminum Diethyl Phosphinate
e) from 0.5% to 5% by weight of organic polyhydric polymer.

Another polyamide thermoplastic composition according to the invention is characterized in that it comprises:
b) from 5% to 20% by weight of Aluminium hypophosphite,
d) from 3% to 15% by weight of a Melamine cyanurate
c) from 2.5% to 10% by weight of Aluminum Diethyl Phosphinate
e) from 0.5% to 5% by weight of EVOH.

Experimental Part

In the following examples, the below listed components were used:
Polymers:
Polyammide 6 (currently commercially available as Latamid 6, by Lati), hereafter "PA6"
Reinforcing Agents:
Glass fiber (PPG3786, by PPG), hereafter "GF"
Lubricants:
Ethylene Bis Stearamide (by Sinochem), hereafter "EBS"
Stabilizers:
Hindered phenol heat stabilizer (Irganox 1098, by Ciba), hereafter "Irg. 1098"
Phosphite process stabiliser (Irgaphos 168, by Ciba), hereafter "Irg. 168"
Hypophosphite or Inorganic Phosphinate:
Aluminium hypophosphite (Phoslite IP-A, by Italmatch Chemicals), hereafter "IP-A"
Organic Phosphinate:
Alluminium Di Ethyl Phosphinate (Exolit OP1230, by Clariant), hereafter "DEPAL"
Nitrogen Flame Retardant:
Melamine cyanurate (Melagard MC25, by Italmatch Chemicals), hereafter "MC"
Flame Retardant Polyhydric Synergic:
Ethylene Vinyl Alcohol (Soarnol DT2904, by Nippon Gohsei Europe, 29% Ethylene,
MFR 210° C. 2.16 kg=4 gr/10'), hereafter "EVOH-1"
Ethylene Vinyl Alcohol (Eval M100B, by Eval Belgium, 24% Ethylene, MFR 210° C.
2.16 kg=2.2 gr/10'), hereafter "EVOH-2"
Flame Retardant and Synergics for Comparative Examples:
Melamine polyphosphate (Melapur 200/70, by BASF), hereafter "MPP"
Alluminium Methyl Methyl Phosphonate, hereafter "AMMP"
Di pentaeryritol (Charmor DP40, by Perstorp), hereafter "DI-PERT"

Examples According to the Invention (Ex. 1, 2, 3) and Comparative Examples (C.4 to C.16)

All components reported in table 1 are compounded in a 20 mm twin screw extruded with a temperature profile in the range 250-270° C. The polymer is dried 1 night in an oven at 120° C. before extruding. After a second drying of the compound in the same conditions, pellets were injection moulded on UL-94 specimens at 0.6 mm and 5 specimens were conditioned for 24 hours at 23° C. and 50% humidity. Flammability have been reported according to UL-94 procedure. When tests do not meet V0, V1 and V2 an NC classification has been given, when it was not possible to extrude or to inject samples an ND classification was attributed.

Glow wire was measured according to IEC 61335-1 on 1 mm injection moulded square plaques.

TABLE 1

|  | Ex. 1 | Ex. 2 | Ex. 3 | C. 4 | C. 5 | C. 6 | C. 7 | C. 8 | C. 9 |
|---|---|---|---|---|---|---|---|---|---|
| PA 6 | 49.3% | 49.3% | 49.3% | 49.3% | 49.3% | 49.3% | 49.3% | 49.3% | 49.3% |
| IP-A | 11% | 11% | 10% | 10% | 14% | 14% |  |  |  |
| DEPAL | 3% | 3% | 6% | 7% |  | 3% | 16% | 16% | 22% |
| MC | 8% | 8% | 8% | 8% | 8% | 8% |  | 9% |  |
| DI-PERT |  |  |  |  |  |  |  |  |  |
| EVOH-2 | 3% |  |  |  |  |  |  |  |  |
| EVOH-1 |  | 3% | 1% |  | 3% |  |  |  |  |
| MPP |  |  |  |  |  |  | 9% |  |  |
| AMMP |  |  |  |  |  |  |  |  |  |
| GF | 25% | 25% | 25% | 25% | 25% | 25% | 25% | 25% | 25% |
| EBS | 0.3% | 0.3% | 0.3% | 0.3% | 0.3% | 0.3% | 0.3% | 0.3% | 0.3% |
| Irg. 1098 | 0.3% | 0.3% | 0.3% | 0.3% | 0.3% | 0.3% | 0.3% | 0.3% | 0.3% |
| Irg. 168 | 0.1% | 0.1% | 0.1% | 0.1% | 0.1% | 0.1% | 0.1% | 0.1% | 0.1% |
| UL-94 0.6 mm | V0 | V0 | V0 | V0 | NC | NC | V0 | V0 | V0 |
| GWIT 1 mm | 850° C. | 850° C. | 850° C. | 800° C. | — | — | 800° C. | 775° C. | 750° C. |

|  | C. 10 | C. 11 | C. 12 | C. 13 | C. 14 | C. 15 | C. 16 |
|---|---|---|---|---|---|---|---|
| PA 6 | 49.3% | 49.3% | 49.3% | 49.3% | 49.3% | 49.3% | 49.3% |
| IP-A |  | 3% |  | 3% |  | 11% | 11% |
| DEPAL | 22% | 14% | 14% | 14% | 14% | 3% |  |
| MC |  | 8% | 8% |  |  | 8% | 8% |
| DI-PERT |  |  |  |  |  | 3% |  |
| EVOH-2 |  |  |  |  |  |  |  |
| EVOH-1 | 3% |  | 3% |  | 3% |  | 3% |
| MPP |  |  |  | 8% | 8% |  |  |
| AMMP |  |  |  |  |  |  | 3% |
| GF | 25% | 25% | 25% | 25% | 25% | 25% | 25% |
| EBS | 0.3% | 0.3% | 0.3% | 0.3% | 0.3% | 0.3% | 0.3% |
| Irg. 1098 | 0.3% | 0.3% | 0.3% | 0.3% | 0.3% | 0.3% | 0.3% |
| Irg. 168 | 0.1% | 0.1% | 0.1% | 0.1% | 0.1% | 0.1% | 0.1% |
| UL-94 0.6 mm | V0 | V0 | V0 | V0 | V0 | NC | NC |
| GWIT 1 mm | 775° C. | 775° C. | 775° C. | 800° C. | 800° C. | — | — |

Comments to Examples Ex. 1, 2, 3, According to the Invention and to Comparative Examples C. 4, 5, 6, 7, 8, 9, 10, 11, 12, 13, 14, 15, 16 as Reported in Table 1

Examples Ex. 1, 2 and 3 according to present invention show both UL-94 V0 behaviour and GWIT>800° C.

Comparative Examples C.7, C.8, C.9 and C10 show how Organic phospinate metal salt alone (C.9) or in combination with Nitrogen (C.8) or Nitrogen-phosphorus compound (C.7) or in combination with Organic polyhydric polymer (C.10) is not able to achieve GWIT>800° C.

Comparative Example C.4, C.6, C.11, C13 show how Hypophosphite, in combination with Organic phosphinate metal salt and Nitrogen (C.4, C.6 and C.11) or in combination with Organic phosphinate metal salt and Nitrogen-Phosphorus compound (C.13) is not able to achieve GWIT>800° C. This means that compound named as organic polyhydric polymer are also essential in order to reach the desired results.

Comparative Example C.5 show how Hypophosphite, Nitrogen compound and organic polyhydric polymer is not able to achieve UL-94 V0. This means that the presence of organic phosphinate is also essential to reach the desired results.

Comparative Example C.12 and C.14 show how Organic phosphinate metal salt, Nitrogen and organic polyhydric polymer (C.12) and Organic phosphinate metal salt, Nitrogen-phosphorus compound and organic polyhydric polymer (C.14) are not able to achieve GWIT>800° C. In other words, the absence of inorganic phosphinates is prejudicial for reaching the desired results.

Comparative Example C.15 show how Hypophosphite, Organic phosphinate metal salt, Nitrogen compound and an organic polyhydric not polymeric is not able to achieve UL-94 V0.

Comparative Example C.16 show how Hypophosphite, Nitrogen compound, organic polyhydric polymer and AMMP is not able to achieve UL-94 V0, due to the absence of organic phosphinate according to the present invention.

AMMP (Aluminum Methyl Methyl Phosphonate) is a molecule containing a Phosphorus-Carbonium link, but Phosphorus oxidation state is +3, indeed is not within the scope of present invention.

The above discussed results, show that the presence of at least a) to e) components according to the present invention is essential, due to their synergic effect, not only to achieve V0 values at UL-94 0.6 mm, but also to pass GWIT test at higher than 800° C., according to IEC 61335-1. Comparative examples show that, when not all components a) to e) according to the present invention are present, even when V0 test is passed, GWIT test fail. Thus, the presence of all the components as indicated in the present invention as a) to e) is necessary in order to reach the desired results.

The invention claimed is:
1. Halogen free flame retardant polyamide thermoplastic composition consisting of:
   a) at least a thermoplastic polyamide polymer;
   b) from 5% to 20% by weight of aluminum hypophosphite, as first flame retardant (1st FR) component;
   c) from 2.5% to 10% by weight of aluminum diethyl phosphinate, as second flame retardant (2nd FR) component;
   d) from 3% to 15% by weight of a Melamine cyanurate, as third flame retardant (3rd FR) component;
   e) from 0.5% to 5% by weight of an organic polyhydric polymer being defined as an organic polymeric molecule containing many hydroxyl (—OH) radicals, not linked to aromatic or conjugated unsaturated bonds, as fourth flame retardant (4th FR) component, provided that said organic polyhydric polymer is not a phenol-formaldehyde resin;

f) fillers and/or reinforcing fibers; and g) other conventional additives, the total percentage of components a) to g) being 100%.

2. The halogen free flame retardant polyamide thermoplastic composition according to claim 1, wherein said other conventional additives are selected from the group consisting of: processing aids, heat and process stabilizers, UV stabilizers, antidripping agents, pigments, dispersing agents, mould release additives, nucleating agents, partially cross-linked elastic polymers used as impact modifiers, and their mixtures.

3. The halogen free flame retardant polyamide thermoplastic composition according to claim 1, wherein said at least a thermoplastic polyamide polymer is polyamide 6.

4. The halogen free flame retardant polyamide thermoplastic composition according to claim 3, wherein said at least a thermoplastic polyamide polymer is glass reinforced polyamide 6.

5. Halogen free flame retardant polyamide thermoplastic composition consisting of:

a) at least a thermoplastic polyamide polymer;

b) from 5% to 20% by weight of aluminum hypophosphite, as first flame retardant (1st FR) component;

c) from 2.5% to 10% by weight of aluminum diethyl phosphinate, as second flame retardant (2nd FR) component;

d) from 3% to 15% by weight of a Melamine cyanurate, as third flame retardant (3rd FR) component;

e) from 0.5% to 5% by weight of EVOH, as fourth flame retardant (4th FR) component;

f) fillers and/or reinforcing fibers; and g) other conventional additives, the total percentage of components a) to g) being 100%.

6. The halogen free flame retardant polyamide thermoplastic composition according to claim 5, wherein said other conventional additives are selected from the group consisting of: processing aids, heat and process stabilizers, UV stabilizers, antidripping agents, pigments, dispersing agents, mould release additives, nucleating agents, partially cross-linked elastic polymers used as impact modifiers, and their mixtures.

7. The halogen free flame retardant polyamide thermoplastic composition according to claim 5, wherein said at least a thermoplastic polyamide polymer is polyamide 6.

8. The halogen free flame retardant polyamide thermoplastic composition according to claim 7, wherein said at least a thermoplastic polyamide polymer is glass reinforced polyamide 6.

* * * * *